(12) United States Patent
Barley et al.

(10) Patent No.: US 8,131,144 B2
(45) Date of Patent: Mar. 6, 2012

(54) ACTION CAMERA WITH CAPABILITY OF CAPTURING IMAGES IN DAYLIGHT AND INFRARED

(75) Inventors: Christopher B. Barley, Grand Prairie, TX (US); James Brandon Roach, Grand Prairie, TX (US)

(73) Assignee: WGI Innovations, Ltd., Grand Prairie, TX (US)

( * ) Notice: Subject to any disclaimer, the term of this patent is extended or adjusted under 35 U.S.C. 154(b) by 0 days.

(21) Appl. No.: 12/833,108

(22) Filed: Jul. 9, 2010

(65) Prior Publication Data

US 2012/0008930 A1    Jan. 12, 2012

(51) Int. Cl.
*G03B 7/00* (2006.01)
*H04N 5/225* (2006.01)

(52) U.S. Cl. ........................... 396/241; 348/342

(58) Field of Classification Search ............... 396/241, 396/275, 463, 508; 348/340, 342, 360; 359/889, 359/891–892; 310/46, 261.1
See application file for complete search history.

(56) References Cited

U.S. PATENT DOCUMENTS

| | | | |
|---|---|---|---|
| 5,070,407 A | 12/1991 | Wheeler et al. | |
| 6,580,459 B2 | 6/2003 | Uchino | |
| D547,346 S | 7/2007 | Ollila | |
| 7,297,924 B2 | 11/2007 | DelTel et al. | |
| D564,558 S | 3/2008 | Ollila | |
| 7,430,009 B2 | 9/2008 | Kokuwa et al. | |
| D580,907 S | 11/2008 | Ollila | |
| D588,076 S | 3/2009 | Ollila | |
| D588,114 S | 3/2009 | Ollila | |
| D589,998 S | 4/2009 | Ollila | |
| D589,999 S | 4/2009 | Ollila | |
| 2005/0179779 A1 * | 8/2005 | Oochi et al. | 348/207.99 |
| 2005/0200750 A1 | 9/2005 | Ollila | |
| 2006/0055786 A1 | 3/2006 | Ollila | |
| 2009/0052886 A1 * | 2/2009 | Watanabe et al. | 396/486 |
| 2009/0180773 A1 * | 7/2009 | Yasuda et al. | 396/463 |

* cited by examiner

*Primary Examiner* — W. B. Perkey
*Assistant Examiner* — Minh Phan
(74) *Attorney, Agent, or Firm* — Geoffrey A. Mantooth

(57) ABSTRACT

The action camera has a housing, a lens, and an image sensor located in a light path from the lens. A filter is operable to move between first and second positions, with the first position located in the light path and the second position located out of the light path. An actuator moves the filter between the first and second positions. The actuator includes an electromagnet and a magnet. One of the electromagnet and the magnet is fixed relative to the light path, while the other of the electromagnet and the magnet is movable relative to the light path and is coupled to the filter. The magnet has poles that interact with the poles of the electromagnet. As the electromagnet is energized, the magnet rotates. The polarity of the electromagnet is reversed in order to reverse the rotation of the magnet. The camera is also provided with a light source. When the light source is activated, then the filter is moved accordingly. The actuator is small and consumes little electrical power.

12 Claims, 9 Drawing Sheets

ACTION CAMERA WITH CAPABILITY OF CAPTURING IMAGES IN DAYLIGHT AND INFRARED

FIELD OF THE INVENTION

The present invention relates to portable cameras that can capture images in both daylight and infrared conditions.

BACKGROUND OF THE INVENTION

Action cameras are small, lightweight portable cameras used to take video, still pictures or both. Action cameras are used in action sports, such as hunting, BMX (bicycle motorcross), snow skiing or snowboarding, surfing, car racing, skydiving, etc. The camera is typically mounted so as to point ahead where the operator is going. For example, in bicycling, the camera may be mounted to the handlebars of the bicycle. In snowboarding, the camera may be mounted to the helmet of the snowboarder. In hunting, the camera may be mounted to either the hunter's head or to the hunter's gun.

While many action cameras operate in daylight conditions, there are instances where artificial lighting is desired to supplement low natural light for darkness. For example, hunters hunt at dawn and dusk. In order to avoid scaring wildlife away, infrared lighting is preferred to white light. Therefore, equipping an action camera with infrared lighting is desirable.

Digital cameras use an image sensor to capture the image, whether video or still. Most image sensors react differently to white, or visible, light than to infrared light. In order to compensate, when the image sensor is configured for white light, or daylight, an infrared cut filter is located in-line with the image sensor (between the lens and the image sensor). The infrared cut filter filters out infrared light from the image sensor. When the image sensor is configured for infrared or night conditions, the infrared cut filter is removed from the path of light and a clear, or infrared pass, filter can be put in-line with the image sensor.

In an action camera, several factors, such as weight and power consumption, come in to play when designing a system to remove the infrared cut filter relative to the image sensor.

SUMMARY OF THE INVENTION

The present invention provides a portable camera that comprises a housing, a lens, an image sensor, a filter, an actuator and a power source. The image sensor is located in a light path from the lens. The filter is operable to move between a first position located in the light path and a second position located out of the light path. The actuator comprises an electromagnet and a magnet. One of the electromagnet and the magnet is fixed relative to the light path while the other of the electromagnet and the magnet is movable relative to the light path and is coupled to the filter. The magnet has at least first, second and third poles, with the first and third poles having the same polarity and the second pole being opposite in polarity from the first and third poles and intermediate between the first and third poles. The electromagnet has fourth and fifth poles that are adjacent to the magnet. The magnet second pole is attracted to either one of the fourth and fifth poles of the electromagnet, depending on the polarity of the electromagnet. The power source is connected to the electromagnet. The power source provides electrical power to the electromagnet. The power source is capable of changing the polarity of the electrical power provided to the electromagnet so as to change the polarity of the fourth and fifth poles of the electromagnet.

In accordance with one aspect, the camera further comprises a filter holder. The filter holder comprises a filter part that is coupled to the filter and a support arm. The support arm has a pivot point. The other of the electromagnet and the magnet that is movable moves the support arm and the filter part about the pivot point.

In accordance with another aspect of the camera, the filter comprises a first filter. There is a second filter that is movable in and out of the light path by the actuator.

In accordance with another aspect, the camera comprises first and second filter holders, with each filter holder comprising a filter part that is coupled to the respective first or second filters, and a support arm. Each support arm has a pivot point. The other of the electromagnet and the magnet that is movable moves the support arm and the filter part of the first filter holder about the first filter holder pivot point in a first direction and moves the support arm in the filter part of the second filter holder about the second filter holder pivot point in a direction that is opposite to the first direction.

In accordance with another aspect, the camera has the other of the electromagnet or the magnet that is movable engage the support arm of the first filter holder at a first filter location that is between the first filter and the respective pivot point, and engages the support arm of the second filter holder at a second filter location that is interposed between the second filter and the second filter location.

In accordance with another aspect, the electromagnet is fixed and the magnet rotates.

In accordance with another aspect, the electromagnet is "U" shaped. In accordance with another aspect, the magnet rotates less than 90 degrees.

In accordance with another aspect, the magnet has a finger that engages a slot on a support arm that is coupled to the filter. The support arm rotates about a pivot point.

In accordance with still another aspect, the camera further comprises a light source and a processor. The light source provides light within a field of view of the lens. The processor controls the position of the filter in the light path. The processor moves the filter with respect to the light path when the light source is illuminated.

In accordance with still another aspect, the light source is an infrared light source and the filter is an infrared cut filter, wherein when the light source is illuminated, the infrared cut filter is located out of the light path.

In accordance with still another aspect of the portable camera, the filter comprises a first filter. A second filter is also provided that is movable in and out of the light path by the actuator. First and second filter holders are provided, with each filter holder comprising a filter part that is coupled to the respective first or second filters, as well as a support arm. Each support arm has a pivot point. The other of the electromagnet and the magnet that is movable moves the support arm and the filter part of the first filter holder about the first filter holder pivot point in a first direction and moves the support arm in the filter part of the second filter holder about the second filter holder pivot point in a direction that is opposite of the first direction. The other of the electromagnet or magnet is movable and engages the support arm in the first filter holder at a first filter location that is between the first filter and the respective pivot point and engages the support arm of the second filter holder at a second filter location that is interposed between the second filter and the second filter location. The electromagnet is fixed and the magnet rotates. The electromagnet is "U" shaped. The magnet rotates less than 90 degrees. The magnet has a finger that engages the slot on a support arm that is coupled to the filter. The support arm rotates about a pivot point.

DESCRIPTION OF THE PREFERRED EMBODIMENT

Figure 1:
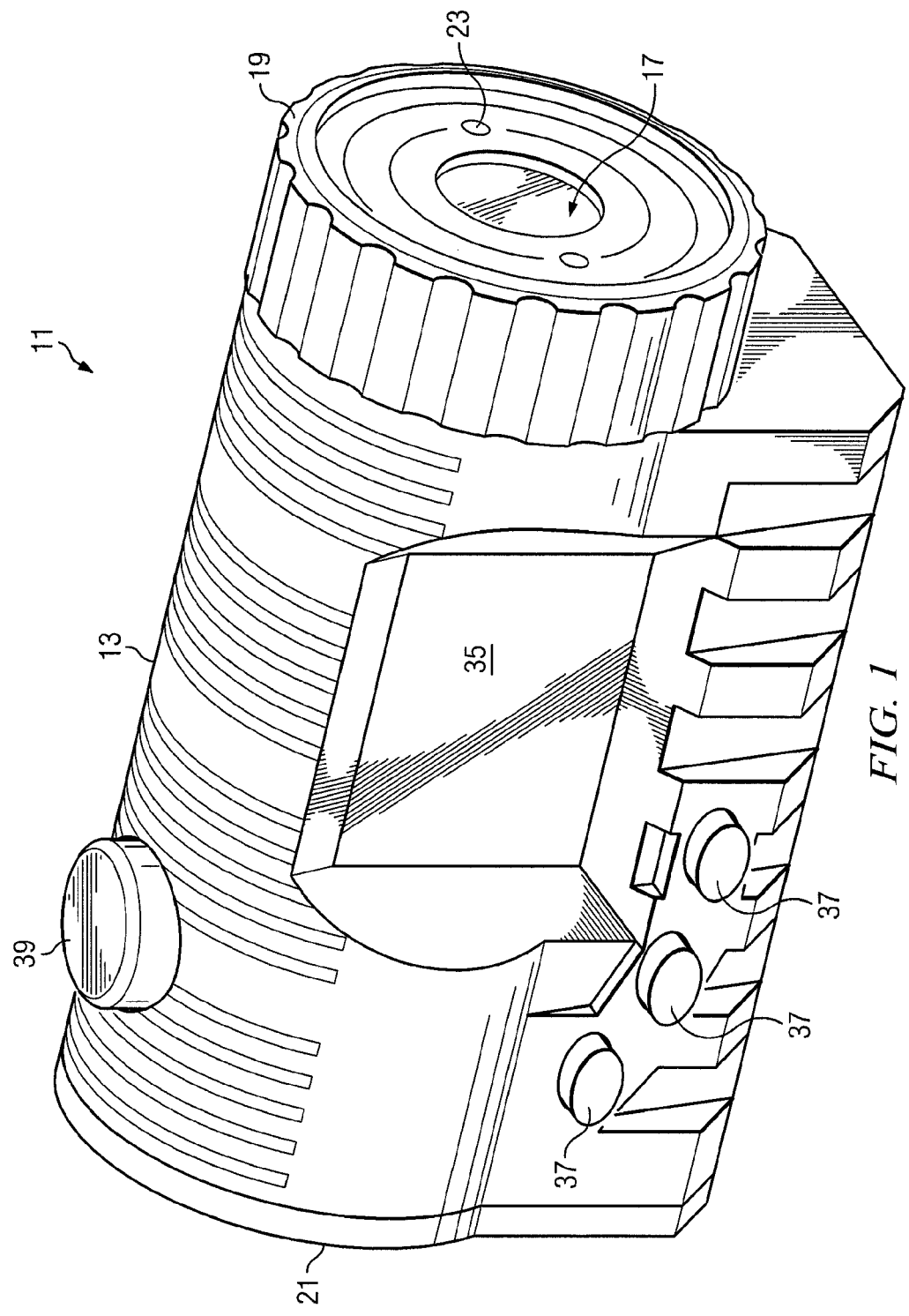
FIG. 1 is a perspective view showing the camera in accordance with a preferred embodiment.
Figure 2:
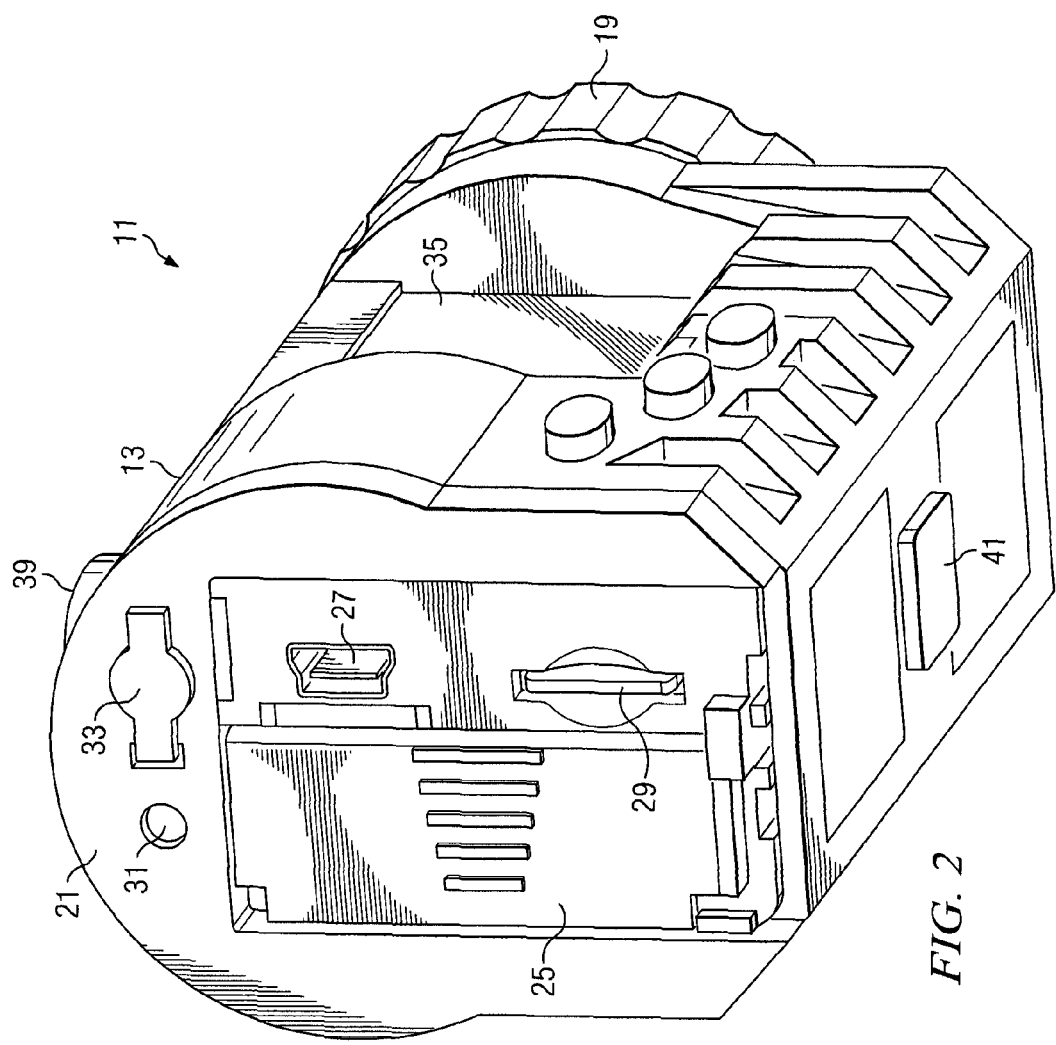
FIG. 2 is a perspective view of the rear end of the camera, with a rear cover removed to show several components.

The action camera 11 is shown in FIGS. 1 and 2. The camera is small, lightweight and portable. It can be carried in the hand or mounted to a person (such as a helmet) or to a piece of equipment (such as a bicycle). The camera 11 can be operated to take video or still pictures. The camera described herein is a digital camera, although the camera could be a film camera.

The camera is particularly adapted to take pictures in normal lighting conditions (such as daylight) as well as in low light conditions (such as night). The camera has one or more filters that are moved in and out of the light path between the camera lens and the image sensor. The filters optimize the light for normal lighting conditions and optimize the light for low lighting conditions.

Because of the small size and limited power supply, the camera does not use a conventional motor to change the filters. Instead, the camera uses magnets.

The camera 11 will now be described in more detail. The camera includes a housing 13, electronics 15 (see FIG. 3) and a lens 17.

The housing 13 has a front end 19 and a rear end 21. The front end 19 contains the lens 17 and a light source 23 (FIG. 1 shows only a few of the light sources 23). In FIG. 2, which shows the rear end 21 of the camera, a cover is shown as removed to allow viewing of components. The rear end 21 contains a cavity for a battery 25 (shown behind an inner cover, which inner cover is optional), one or more input/output ports 27, a memory card receptacle 29 (shown with a removable memory card), an indicator light 31 and a port 33 for an external power supply or charger (shown with a cover in place). The housing also has a user interface in the form of a display 35, keys or buttons 37 and a record button 39. The housing has a mount 41 on one side, which side is free of the user interface. The mount 41 is used to mount the camera to other apparatuses such as a helmet or a bicycle.

Figure 3:
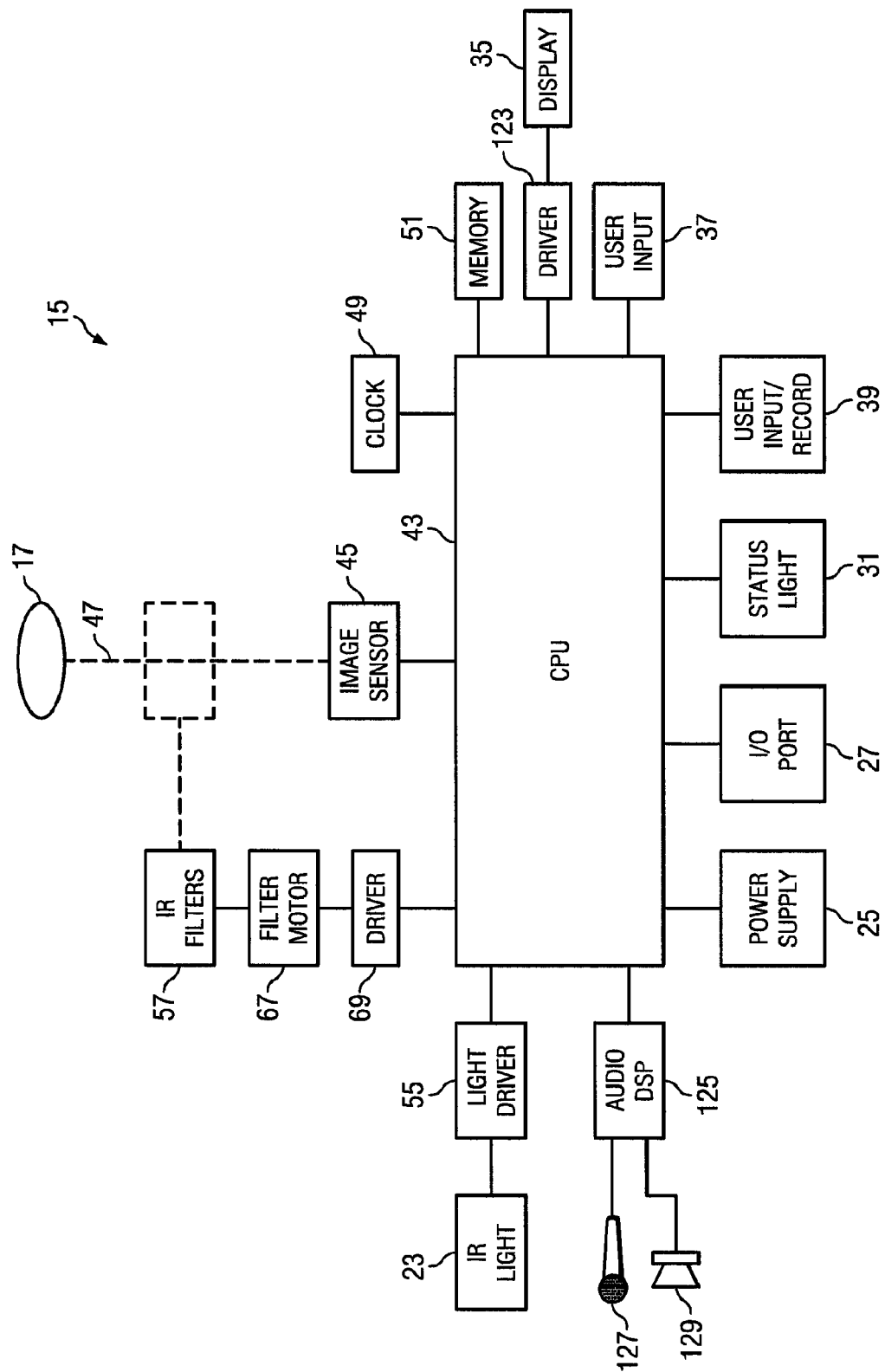
FIG. 3 is a block diagram showing the electronics of the camera.

FIG. 3 shows a block diagram of the electronics 15 and the lens 17, which are contained in the housing 13. A central processing unit (CPU) 43 is provided. In the preferred embodiment, the CPU incorporates features of a video processor. An image sensor 45 provides inputs to the CPU 43. The image sensor 45 can be a CMOS or CCD type sensor. The image sensor is located behind the lens 17. A light path 47 extends from the lens 17 to the image sensor 45. The image sensor captures the image and provides it to the CPU for processing. The CPU 43 has a clock 49.

Memory 51 is connected to the CPU. The memory includes nonvolatile memory and may include volatile memory. In addition, removable memory devices, such as memory cards, can be used. Memory cards are referred to as external memory. The memory card is inserted into the slot 29 and is removable.

The camera can take pictures or video in daylight and also in lowlight conditions using a light source. In the preferred embodiment, the light source is infrared (1K) provided by LED's 23 (light emitting diodes). The lights 23 are powered by a driver 55 which is connected to the CPU 43. If the camera is taking video, then the lights stay on during filming. If the camera is taking still pictures, then the lights illuminate long enough to capture the picture.

Filters 57 are removably provided between the lens 17 and the image sensor 45, in the light path 47. In the preferred embodiment, there are two filters. One filter is an infrared cut filter, which blocks infrared light. The infrared cut filter is located in the light path for daylight filming. The other filter is an infrared pass filter and allows infrared light to reach the image sensor. The infrared pass filter is used during low light filming and when the infrared lights 53 are illuminated.

Figure 4:
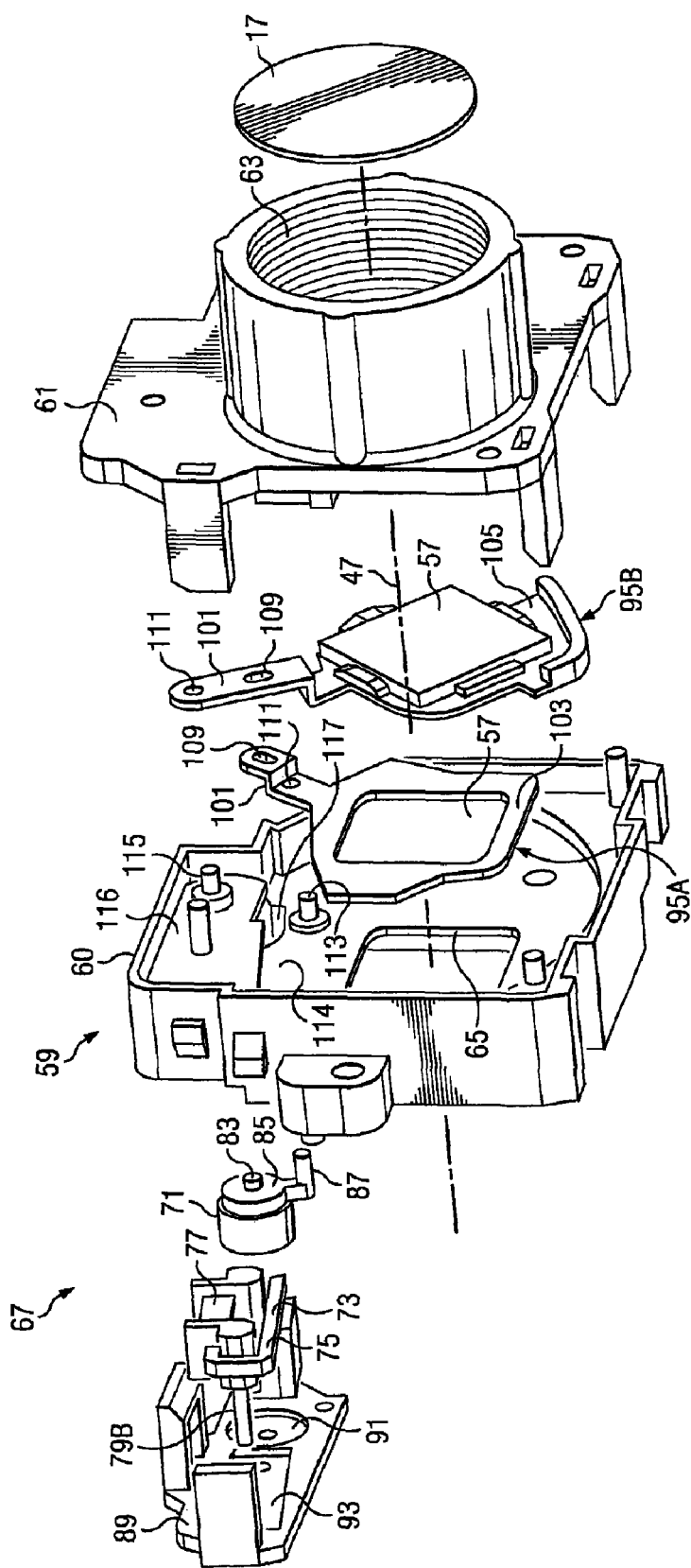
FIG. 4 is a perspective exploded view of the lens filter exchange assembly.

FIG. 4 shows the lens filters. The filters are located in a lens mount housing 59, which housing has an inner portion 60 and an outer portion 61. The outer portion 61 has a cylindrical bore 63 for holding the lens 17 (although the lens 17 is shown in FIG. 4 with no curvature on the front side, it is understood that the lens may have the appropriate curvature or shape). The inner portion 59 has an opening 65 aligned with the lens 17 and in-line with the light path 47. The image sensor 45 (not shown in FIG. 4) is located adjacent to the opening 65. The inner and outer portions 60, 61 couple together and have a cavity therein for receiving the filters 57.

The filters 57 are moved in and out of the light path 47 by a filter motor 67 (see FIGS. 3 and 4). The filter motor is driven by a driver 69 which in turn is connected to the CPU 43.

Because of the small size and light weight of the action camera, the filter motor 67 does not use a conventional electric rotary motor with a stator and rotor and gears. The filter motor 67 is shown in FIG. 4 and includes a magnet 71 and an electromagnetic 73. One of the magnet and the electromagnet moves while the other of the magnet and the electromagnet remains stationary with respect to the lens mount housing 59. The moving element moves the filters 57 in and out of the light path 47. In the preferred embodiment, the magnet 71 rotates while the electromagnetic 73 is fixed.

Figure 5A:
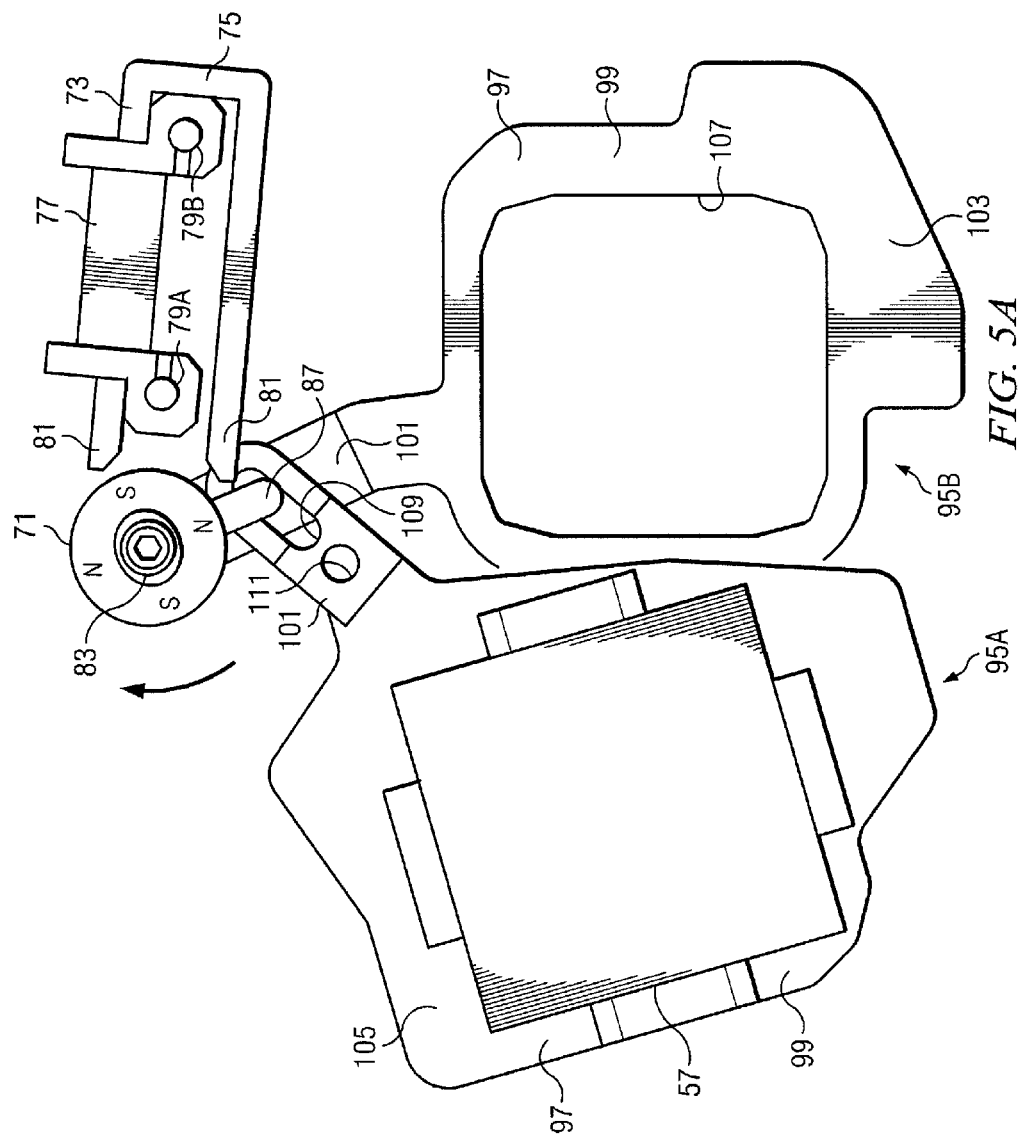
FIGS. 5A and 5B show the exchange of the lens filters, from the image sensor side.
Figure 5B:
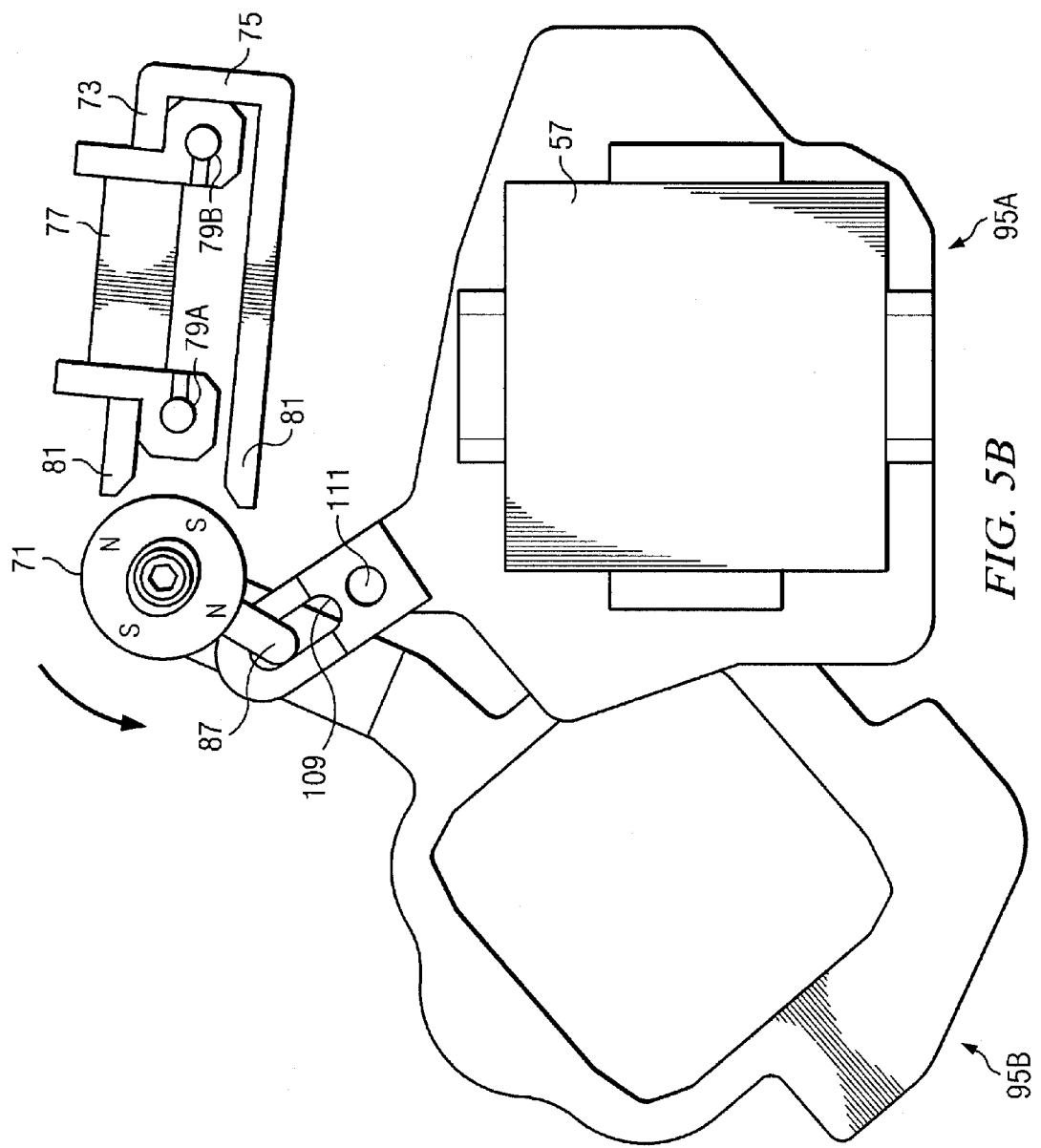

Referring to FIGS. 4-5B, the electromagnet 73 has a "U" shaped magnetizable member 75, such as made of a ferromagnetic material. A coil 77 of wire is located around a portion of the "U" shaped member. The coil has pins 79A, 79B. The free ends of the "U" shaped member form the poles 81 of the electromagnet. When a voltage is applied to the pins, the electromagnet becomes magnetized. The polarity of the magnetic poles changes if the voltage polarity applied to the pins changes. For example, if the voltage polarity is pin 79A (+), pin 79B (−), the magnetic poles are, using the orientation shown in FIGS. 5A and 5B, top pole (N) and bottom pole (S). The poles reverse if the voltage polarity on the pins 79A, 79B reverses.

The magnet 71 is ring shaped or disc shaped. The polarity of the magnet 71 is shown in FIGS. 5A and 5B, where the adjacent north and south poles are located on the outside diameter and are approximately 90 degrees apart. This type of magnet has multi-poles on the circumference. Alternatively, the magnet could be radially magnetized with multi-poles wherein opposite poles are located on the inside diameter of the ring shaped magnet.

A shaft 83 extends axially through the magnet 71. Coupled to the magnet 71 is a disk 85. A projection extends radially from the disk. A finger 87 then extends from the projection, which finger is parallel to the shaft 83. The finger 87 is thus offset from the shaft 83.

The electromagnet and magnet are mounted to the lens mount housing 59 by way of an electromagnet cover 89. The cover 89 fixes the electromagnet 73 in place relative to the lens mount housing. The cover 89 has a circular inner recess 91 for receiving the magnet 71 and an inner recess 93 for receiving the electromagnet. The pins 79A, 79B extend out of the cover. The cover 89 secures the electromagnet 73 and the magnet in place and allows the magnet 71 to rotate about its shaft 83. The magnet is located adjacent to the poles 81 of the electromagnet. As the polarity of the electromagnet poles 81 change, the magnet 71 will rotate. This is illustrated in FIGS. 5A and 5B where, using the orientation shown, the bottom electromagnet pole 81 is N and the top electromagnet pole is S, the magnet rotates clockwise from FIG. 5A to FIG. 5B. To make the magnet rotate counterclockwise, the polarity of the electromagnet is reversed to the top pole N and bottom pole S.

The magnet 71 moves filter assemblies 95A, 95B which contain the filters 57. Each filter assembly includes one of the filters 57 and a filter holder 97. The filter holder 97 has a main part 99 and a supporting arm 101 that extends from the main part. Each main part 99 has two sides, namely a smooth side 103 and filter side 105. The main part also has an opening 107 for allowing light to pass therethrough. The filter 57 is coupled to the main part 99 on the filter side 105. The filter holders 97 are arranged so that the smooth sides 103 are adjacent to each other. This minimizes scratching of the filters.

Each supporting arm 101 has two holes located along the length of the arm. One hole is a slot 109 that receives the finger 87 from the magnet motor. The other hole 111, or pivot hole, receives a shaft or post that is fixed to the lens mounting housing 59. The location of the pivot hole is different on the two filter assemblies. On a first filter assembly 95A, the pivot hole 111 is between the slot 109 and the respective filter 57. On a second filter assembly 95B, the slot 109 is between the pivot hole 111 and the respective filter. The filter assemblies move by pivoting about posts or pins located in the respective pivot holes 111. The post 113 for one filter assembly 95A projects from a first wall 114 of the lens mounting housing and is received by the pivot hole of the one filter assembly support arm. The post 113 does not contact the other filter assembly. The post 115 for the other filter assembly 95B projects from a second wall 116 of the lens mounting housing and is received by the pivot hole of the second filter housing. As shown in FIG. 4, the second wall forms a shelf relative to the first wall. The post 115 for the second filter assembly is roughly coaxial with the magnet shaft 83. The magnet finger 87 passes through the first wall of the lens mount housing by way of a slot 117. The slot is curved, as the finger moves along the curved path when the magnet rotates.

Figure 6A:
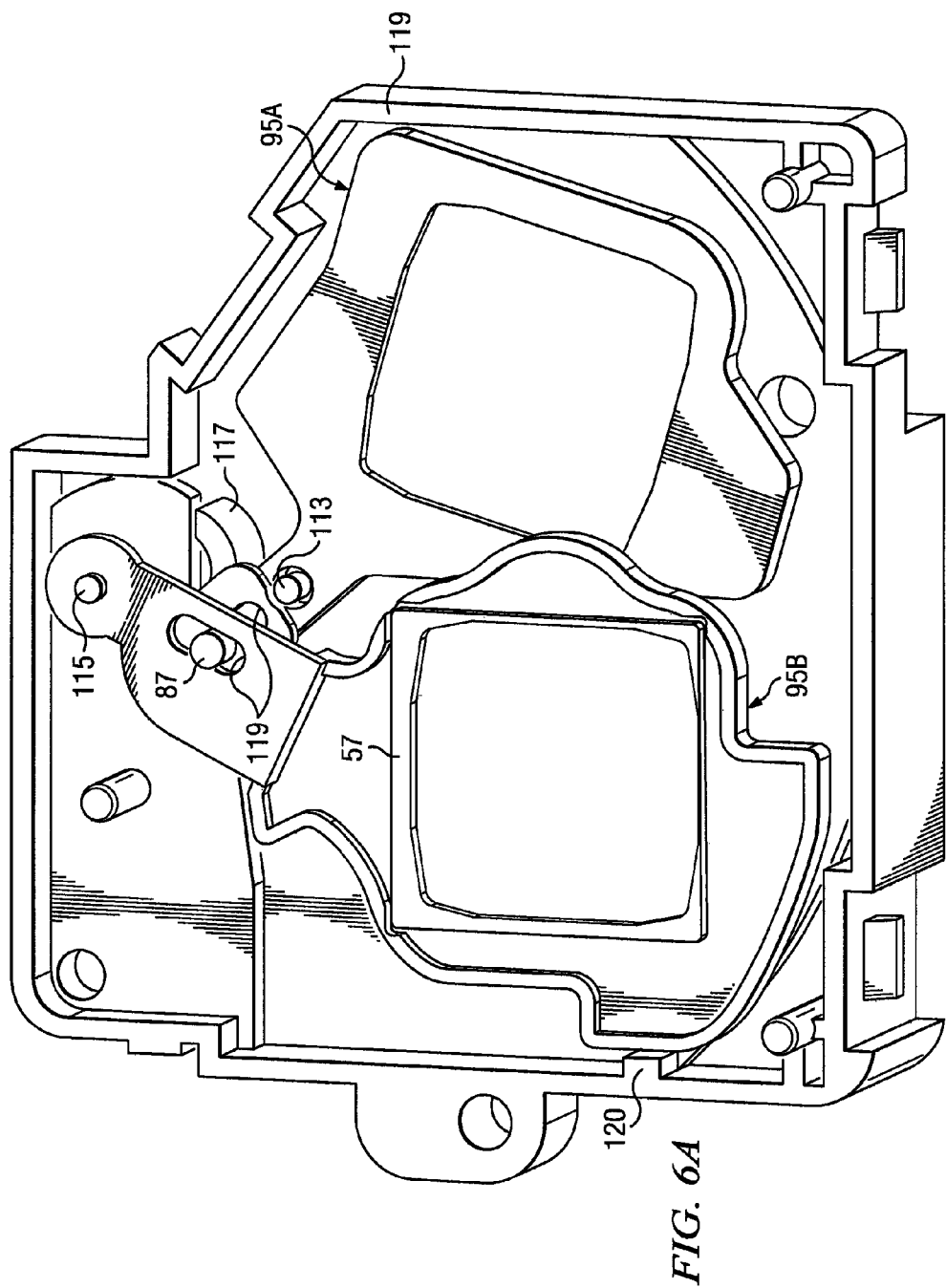
FIGS. 6A and 6B show the exchange of the lens filters, from the lens side, or opposite side of that shown in FIGS. 5A and 5B.
Figure 6B:
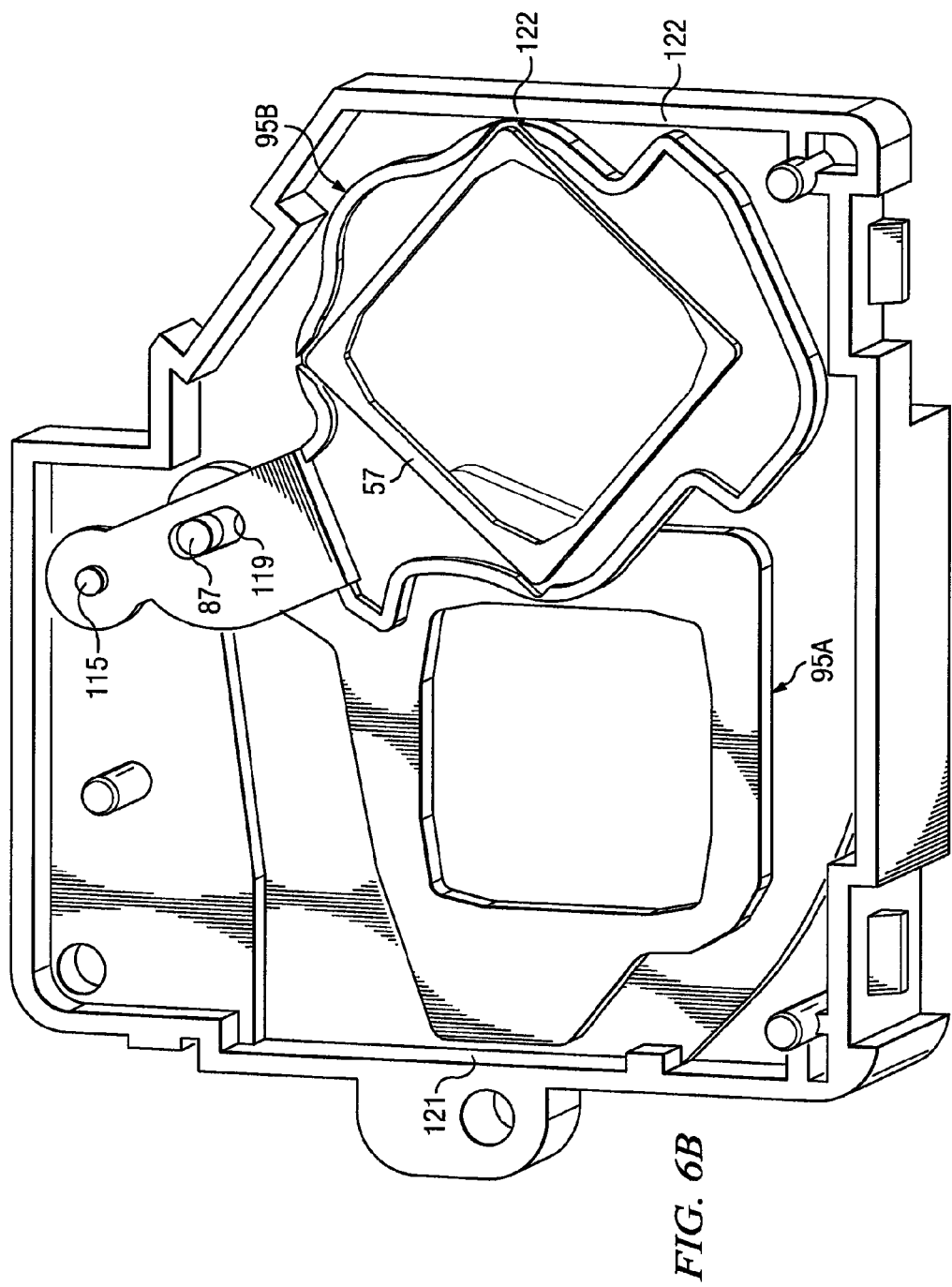

FIGS. 5A, 5B, 6A and 6B show the movement of the filter assemblies 95. FIGS. 5A and 5B are taken from the side of the image sensor looking toward the lens (or left to right referring to the orientation of FIG. 4) and do not show the housing. FIGS. 6A and 6B are taken from the opposite, or lens, side. The filter positions in FIG. 5A correspond to that of FIG. 6A and the filter positions of FIG. 5B correspond to that of FIG. 6B. The filter positions in FIGS. 4 and 6B correspond to each other. In FIGS. 6A and 6B, the outer portion of the lens mount housing has been removed. In FIG. 5A, the second filter assembly 95B is in the light path (the light path is located below the electromagnet 73 in the figures), while the first filter assembly 95A is out of the light path. To reverse this arrangement, the electromagnet 73 polarity is reversed and the magnet 71 rotates clockwise (from FIGS. 5B to 5A, counterclockwise in FIG. 6A) to the position shown in FIGS. 5B and 6B. As the magnet 71 rotates, the magnet finger 87 moves the first filter assembly 95A counterclockwise (in FIG. 5A; clockwise in FIG. 6A) about its pivot hole to a position in-line with the light path, and moves the second filter assembly 95B clockwise (in FIG. 5A, counterclockwise in FIG. 6A) about its pivot point to a position out of the light path. In FIGS. 5A and 5B, the pivot hole for the second filter assembly is located behind the magnet and is approximately the same position as the magnet shaft and is in approximately the same position as the magnet shaft. Conversely, to change the filters, the polarity of the electromagnet is reversed, wherein the magnet rotates counterclockwise (from FIGS. 5B to 5A; counterclockwise from FIGS. 6B to 6A), the first filter assembly pivots clockwise and the second filter assembly pivots counterclockwise.

As shown in FIGS. 6A and 6B, the rotational movement of the filter assembly is limited by the side walls of the lens mount housing 59, which side walls act as stops. In FIG. 6A, the counterclockwise movement of the first filter assembly 95A is stopped by the side wall at 119, while the clockwise movement of the second filter assembly 95B is stopped by a projection 120 from the side wall. As shown in FIG. 6B, the clockwise movement of the first filter assembly is stopped by the side wall at 121, while the counterclockwise movement of the second filter assembly is stopped by the side wall at 122.

Referring again to FIG. 3, the other electronic components will be discussed. The camera has a user interface that includes a display 35 and various buttons or keys 37, 39. The display is of the LCD (liquid crystal display) type and provides information on time and date, on mode of operation (video mode or still images mode), on type of video (high definition I-ID or WGVA), if still pictures are taken, then normal operation (one picture per shutter button operation) or plural pictures per shutter button operation, zoom (whether any zoom is employed and if so the amount) and a delete operation. In addition, the display indicates the level of battery charge and the remaining time of video capability or number of remaining still pictures which is capable of being stored by the memory. The display is connected to the CPU by a driver 123. User input buttons 37, when used in conjunction with the display 35, allow information to be provided to the camera and to the camera user. Also, the record button 39, or shutter button, when pressed, starts recording or takes a still image and when pressed again stops video recording. If the camera is in the still picture mode, the record button operates as a shutter release.

The CPU 43 is also connected to an indicator or status light 31. The status light illuminates when the camera is recording. The CPU is connected to the power supply 25 and to the input/output port or ports. In the preferred embodiment, the input/output ports are a USB port and HDMI port.

An audio digital signal processor (DSP) 125 is connected to the CPU. The audio DSP is connected to a microphone 127 which provides a sound input and to a speaker 129 which provides a sound output.

The operation of the camera is simple. To turn the camera on, the user presses the appropriate button; the display then turns on. The user can make any programming changes to the operation of the camera with the user interface and the display. The record button is pressed to record video or take a still picture.

The CPU performs many functions, such as taking image data from the image sensor, processing the image data and writing the image data to memory, as well as writing any sound data to memory. The audio digital signal processor 125 processes sound received from the microphone 127. The CPU also provides information to the display and accepts user inputs, as well as controls operation of the image sensor, the infrared lights 53 and the filters 57. In addition, the camera automatically senses the light level and determines if the filters need be changed and if the lights 53 turned on.

Figure 7:
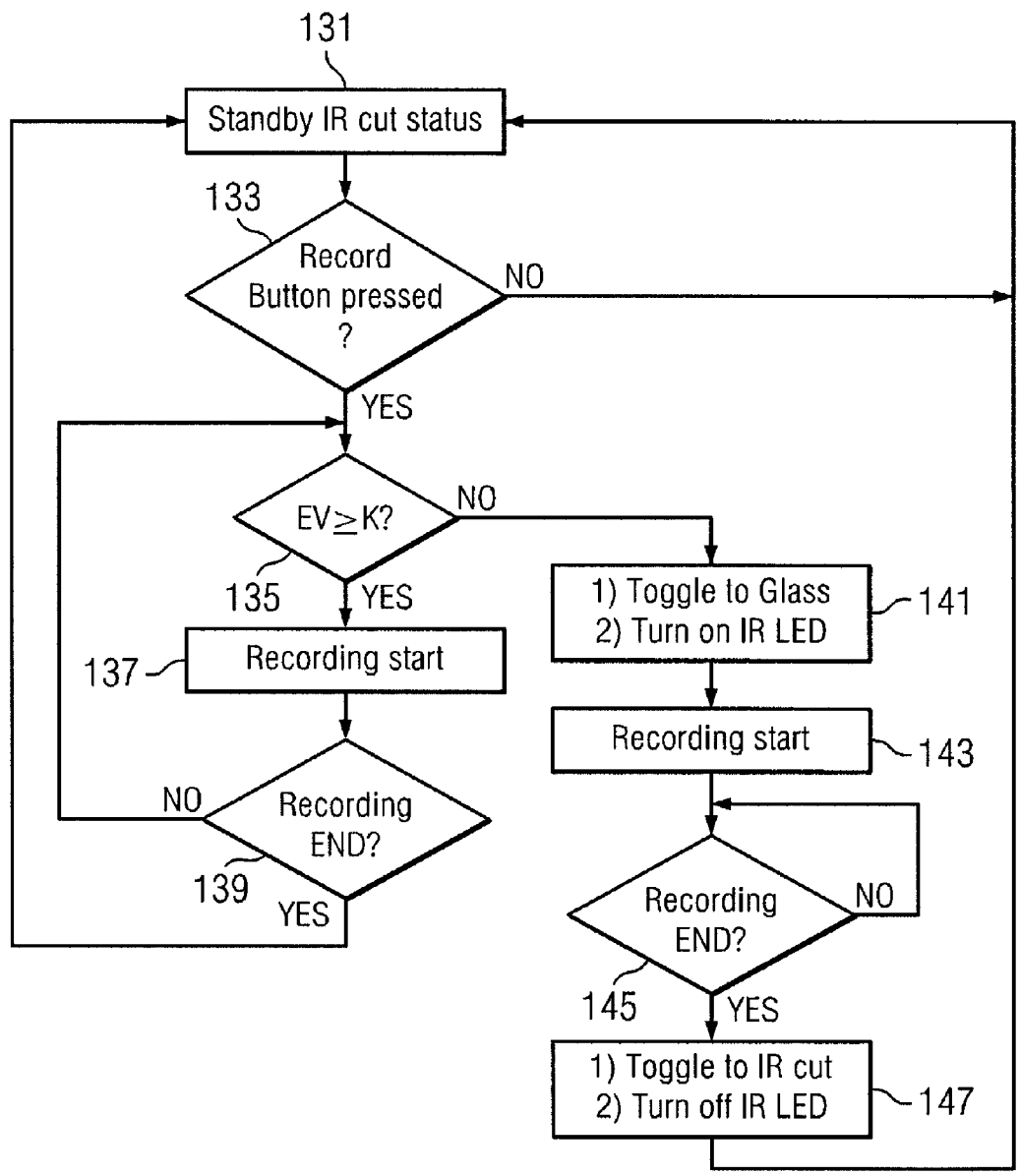
FIG. 7 is a flow chart of the operation of the exchange of the lens filters.

FIG. 7 is a flow chart illustrating this operation. Initially, the camera is in stand by or default mode, wherein the infrared cut filter is in the light path, step 131. The camera is thus configured for daylight operation. In step 133, the camera determines if the record button 39 has been pressed. If NO, then step 131 is repeated. If YES, the camera determines if the exposure value (EV) is above a predetermined threshold value or constant, step 135. The exposure value is a product of the exposure time and the iris aperture that is measured by the image sensor 45. If the exposure time is above the predetermined threshold, the lighting is considered adequate and recording starts, step 137. The camera then determines if the record button 39 has been pressed again, step 139. If YES, then the recording stops and the camera returns to standby mode, step 131. If the recording is not ended, NO, in step 139, then the camera remeasures the exposure value, step 135, to determine if the lighting conditions have changed during recording.

If the lighting conditions are too low so that the result of step 135 is NO, then the filters are changed out. In step 141, the filter motor 67 is operated in order to remove the infrared cut filter from the light path and substitute the infrared pass filter. The driver 69 sends a pulse to the filter motor of sufficient duration and polarity to change the position of the filters. The pulse is then discontinued in order to conserve power. The filters remain in their positions and need not be held in position with the motor 67. In addition, the infrared lights 23 are turned on. In step 143, recording starts. In step 145, the end of recording is monitored. If recording continues, then this step merely loops. If recording ends, then in step 147, the infrared cut filter is relocated back in-line in the light path and the infrared lights are turned off. To move the filters, the driver 69 sends a pulse of opposite polarity than the previous pulse. The camera then returns to step 131 and standby status.

The filter motor 57 provides an actuator to move the filters in and out of the light path, which motor is small and useful for a portable camera. In addition, the filter motor consumes little electrical power.

The foregoing disclosure and showings made in the drawings are merely illustrative of the principles of this invention and are not to be interpreted in a limiting sense.

The invention claimed is:

1. A portable camera, comprising:
   a) a housing;
   b) a lens;
   c) an image sensor located in a light path from the lens;
   d) a filter operable to move between a first position located in the light path and a second position located out of the light path;
   e) an actuator comprising an electromagnet and a magnet, one of the electromagnet and the magnet is fixed relative to the light path while the other of the electromagnet and the magnet is movable relative to the light path and is coupled to the filter, the magnet having at least first, second and third poles, with the first and third poles having the same polarity and the second pole being opposite in polarity from the first and third poles and intermediate between the first and third poles, the first, second and third poles lying in a plane, the electromagnet having a body and a coil, the electromagnet having fourth and fifth poles that are adjacent to the magnet and coplanar with the first, second and third poles, with the magnet second pole being attracted to either one of the fourth and fifth poles of the electromagnet, depending on the polarity of the electromagnet, the magnet having a center, the electromagnet body, coil and fourth and fifth poles located relative to the magnet such that a line collinear with a diameter can extend through the magnet center such that the electromagnet body, coil and the fourth and fifth poles are on one side of the collinear line;
   f) a power source connected to the electromagnet coil, the power source providing electrical power to the electromagnet coil, the power source capable of changing the polarity of the electrical power provided to the electromagnet coil, so as to change polarity of the poles of the electromagnet.

2. The portable camera of claim 1 further comprising a filter holder, the filter holder comprising a filter part that is coupled to the filter, and a support arm, the support arm having a pivot point, the other of the electromagnet and the magnet that is movable moving the support arm and the filter part about the pivot point.

3. The portable camera of claim 1 wherein the filter comprises a first filter, further comprising a second filter that is movable in and out of the light path by the actuator.

4. The portable camera of claim 1 wherein the electromagnet is fixed and the magnet rotates.

5. The portable camera of claim 4 wherein the electromagnet is "U" shaped.

6. The portable camera of claim 5 wherein the magnet rotates less than 90 degrees.

7. The portable camera of claim 4 wherein the magnet has a finger that engages a slot on a support arm that is coupled to the filter, the support arm rotating about a pivot point.

8. The portable camera of claim 1 further comprising a light source and a processor, the light source providing light within a field of view of the lens, the processor controlling the position of the filter in the light path, the processor moving the filter with respect to the light path when the light source is illuminated.

9. The portable camera of claim 8 wherein the light source is an infrared light source and the filter is an infrared cut filter, wherein when the light source is illuminated, the infrared cut filter is located out of the light path.

10. A portable camera, comprising:
   a) a housing;
   b) a lens;
   c) an image sensor located in a light path from the lens;
   d) a filter operable to move between a first position located in the light path and a second position located out of the light path;
   e) an actuator comprising an electromagnet and a magnet, one of the electromagnet and the magnet is fixed relative to the light path while the other of the electromagnet and the magnet is movable relative to the light path and is coupled to the filter, the magnet having at least first, second and third poles, with the first and third poles having the same polarity and the second pole being opposite in polarity from the first and third poles and intermediate between the first and third poles, the electromagnet having fourth and fifth poles that are adjacent to the magnet, with the magnet second pole being attracted to either one of the fourth and fifth poles of the electromagnet, depending on the polarity of the electromagnet;

f) a power source connected to the electromagnet, the power source providing electrical power to the electromagnet, the power source ca able of chan in the polarity of the electrical power provided to the electromagnet, so as to change polarity of the poles of the electromagnet;

g) the filter comprises a first filter, further comprising a second filter that is movable in and out of the light path by the actuator;

h) first and second filter holders, with each filter holder comprising a filter part that is coupled to the respective first or second filters, and a support arm, each support arm having a pivot point, the other of the electromagnet and the magnet that is movable moving the support arm and the filter part of the first filter holder about the first filter holder pivot point in a first direction and moving the support arm and the filter part of the second filter holder about the second filter holder pivot point in a direction that is opposite to the first direction.

11. The portable camera of claim 10 wherein the other of the electromagnet or the magnet that is movable engages the support arm of the first filter holder at a first filter location that is between the first filter and the respective pivot point, and engages the support arm of the second filter holder at a second filter location that is interposed between the second filter and the second filter location.

12. A portable camera, comprising:
a) a housing;
b) a lens;
c) an image sensor located in a light path from the lens;
d) a filter operable to move between a first position located in the light path and a second position located out of the light path;
e) an actuator comprising an electromagnet and a magnet, one of the electromagnet and the magnet is fixed relative to the light path while the other of the electromagnet and the magnet is movable relative to the light path and is coupled to the filter, the magnet having at least first, second and third poles, with the first and third poles having the same polarity and the second pole being opposite in polarity from the first and third poles and intermediate between the first and third poles, the electromagnet having fourth and fifth poles that are adjacent to the magnet with the magnet second pole being attracted to either one of the fourth and fifth poles of the electromagnet, depending on the polarity of the electromagnet;

f) a power source connected to the electromagnet, the power source providing electrical power to the electromagnet, the power source capable of changing the polarity of the electrical power provided to the electromagnet so as to change polarity of the soles of the electromagnet;

g) the filter comprises a first filter, further comprising a second filter that is movable in and out of the light path by the actuator;

h) first and second filter holders, with each filter holder comprising a filter part that is coupled to the respective first or second filters, and a support arm, each support arm having a pivot point, the other of the electromagnet and the magnet that is movable moving the support arm and the filter part of the first filter holder about the first filter holder pivot point in a first direction and moving the support arm and the filter part of the second filter holder about the second filter holder pivot point in a direction that is opposite to the first direction;

i) the other of the electromagnet or the magnet that is movable engages the support arm of the first filter holder at a first filter location that is between the first filter and the respective pivot point, and engages the support arm of the second filter holder at a second filter location that is interposed between the second filter and the second filter location;

j) the electromagnet is fixed and the magnet rotates;
k) the electromagnet is "U" shaped;
l) the magnet rotates less than 90 degrees;
m) the magnet has a finger that engages a slot on a support arm that is coupled to the filter, the support arm rotating about a pivot point.

* * * * *